United States Patent Office 3,482,353
Patented Dec. 9, 1969

3,482,353
SOWING OR PLANTING WASTE GROUND
Max Fischer, Hans Scheuermann, Hermann Klaassen, and Johann Lenz, Ludwigshafen (Rhine), Germany, assignors to Badische Anilin- & Soda-Fabrik Aktiengesellschaft, Ludwigshafen (Rhine), Germany
No Drawing. Filed June 12, 1967, Ser. No. 645,487
Claims priority, application Germany, June 14, 1966, B 87,546
Int. Cl. A01g 7/00
U.S. Cl. 47—9                                     3 Claims

ABSTRACT OF THE DISCLOSURE

A method of "greening" (i.e. sowing or planting) waste ground by applying cured urea-formaldehyde resin foam having a particle size of 1 to 20 mm. suspended in 0.5 to 5 parts by volume of water per part by volume of foam and plant seeds or seedlings to the area to be made green.

---

This invention relates to a method of greening (i.e., sowing or planting) waste ground by the application of urea-formaldehyde resin foam and plant seeds or seedlings.

Methods are already known for planting barren ground in which a layer of urea-formaldehyde resin foam is applied to the ground and plant seeds or plants (i.e., seedlings, cuttings or shoots) are placed in the said layer. It has also already been proposed to apply mixtures of urea-formaldehyde resin and plant seeds in a homogeneous layer to the soil by means of continuous spraying equipment. This method often results in injury to the seeds or plants, however, because constituents of the urea resin foam, such as formaldehyde and methylol compounds of urea, have a harmful effect on the structure of the seeds or plants. To avoid these harmful effects it has been proposed to incorporate into the urea-formaldehyde resin foam a substance which will bind free formaldehyde or react with methylol compounds. It is moreover known to apply to the layer of urea-formaldehyde resin foam another layer which contains formaldehyde-binding substances, the seeds being incorporated in to this layer. This method is however expensive and troublesome. Moreover it is necessary for the foam to be produced in situ so that it is sometimes necessary to move the foaming equipment over the area to be planted. Here again difficulties may be encountered when the ground is difficult to traverse, such as sand dunes, moors or steeply sloping terrain.

We have now found that waste ground can be greened with particular advantage by applying urea-formaldehyde foams and plant seeds or seedlings to the area to be sown or planted, if a cured urea-formaldehyde foam having a particle size of 1 to 20 mm. and suspended in 0.5 to 5 parts by volume of water for each part by volume of foam is applied to the area to be made green.

Suitable urea-formaldehyde foams may be obtained for example by intimately mixing foamed aqueous solutions containing a foaming agent with the aqueous solution of a urea-formaldehyde condensate and curing the mixture. It is particularly advantageous to use finely particled resin foams which have been obtained by condensation of urea-formaldehyde precondensates in which the molar ratio of urea:formaldehyde is 1:1.2 to 1:2 and to which, during foaming, such an amount of urea has been added that the molar ratio of urea:formaldehyde in the cured foamed condensate is from 1:1 to 1:1.4. The condensates may also contain condensed units of other compounds, for example guanidine, acetaldehyde or isobutyraldehyde.

The particle size of the urea-formaldehyde foam is advantageously from 1 to 20 mm. although more finely particled portions, for example dust, and larger particles may also be used. It is advantageous to use mixtures of particles which have been obtained by size reduction of cured blocks of urea-formaldehyde foams. It is favorable to use for the process urea-formaldehyde foams in which the curing process is substantially complete, preferably foams which have been stored at about room temperature for at least one day, advantageously at least two to five days.

The foam is applied to the ground as a suspension with water. Although water may be added in any amount to the urea-formaldehyde foam, it is expedient in order to ensure flowability of the suspension to use 0.5 to 5 parts by volume of water for each part by volume of foam. It is particularly advantageous to use suspensions in which the ratio by volume of foam:water is 1:1.0 to 1:4. An excess of water is generally avoided because transport of large amounts of water which seep away in the soil is uneconomical. The volume of the foam is calculated as absolutely dry material.

The suspensions may contain other additives, for example thickeners, binders, plant protection agents, fertilizers and, within certain limits, fillers or earth. Sometimes it is advantageous to add insoluble dyes or dye pigments to the suspensions to color the area being treated. The color may either be that of the soil or may serve for marking the area. Binders which have proved to be particularly advantageous are sodium alginates because they effect a good bond between the foam particles and the plant seed and favorably affect the structure of the soil beneath the foam layer. Secondary moistening of dry urea-formaldehyde resin foam is considerably improved by the presence of sodium alginates. Other substances may also be added as binders, e.g., certain sugars, cellulose, tall oil, bitumen and starch.

Fine-fibered waste materials from trade effluents may also sometimes be added to the suspended resins. For example paper fibers from the save-all and finely fibered leather waste, have proved to be suitable. Glass fibers and plastic fibers, preferably bristles, e.g., of nylon 6, nylon 6.6 or polyethylene terephthalate, may also be incorporated into the aqueous foam suspensions in many cases, preferably in amounts of up to 20% by weight. This results in excellent adherence to the soil, especially when steep slopes are to be provided with a layer of foam.

According to a particularly advantageous method, plant seeds are added to the suspension of finely particled foam and water. It is possible however, when this is thought to be advisable, to apply the suspension of finely particled foam and water to the soil first and then to carry out sowing or planting.

The suspension of foam, water and any additives and plant seeds is advantageously prepared in a mixing tank and then pumped through a pipe or hose to the place where it is to be used. It is surprising that the suspensions have good flowability and that with the thorough soaking the foam structure is not affected during transport over long distances, even when high pressure is used. It is therefore not necessary to provide complicated foaming and mixing equipment at the place where the foam is to be applied. It is advantageous to use hose with simple nozzles and in carrying out the planting operation it is merely necessary to direct the nozzle to the area to be treated. A method in which the suspension to be used according to this invention is ejected by means of a spray-gun has proved to be very suitable.

The thickness of the layers is advantageously kept at between 0.5 and 10 cm. It is surprising that in the absence of binders the suspensions of finely particled foam should form a coherent layer after they have dried. This layer is so resistant to weathering that the foam particles only become separated to a minor extent if at all.

The process according to the invention is particularly suitable for seeding or planting dry soil. Thus for example sand dunes in deserts and on sea coasts may be treated in accordance with the invention. The process has also proved to be suitable for treating scree, waste and the slopes of heaps of rubble or refuse. It is also possible however to provide areas which are difficult to traverse, for example moorland and swampy areas, with a layer of finely particled urea-formaldehyde foam so that a layer of dense vegetation is formed on the surface of such areas.

The particular advantage of the process over prior art methods is that immediately or a short time after the layer has been applied in accordance with the invention it is possible to walk on it because cured foams are used. A coherent firm layer is formed even without using binders. The cured foam contains only small amounts or traces of formaldehyde or methylol groups so that seeds or seedlings introduced into the plastics layer are not damaged. Moreover it is an advantage that no expensive apparatus is required on site or for transport to the site so that slopes or dunes which are not easily traversable or accessible can be readily provided with a layer that will support vegetation.

The invention is illustrated by the following example.

An aqueous solution containing 1% by weight of foaming agent and 1.5% by weight of phosphoric acid is foamed up in a foaming unit. The foam is mixed in a second mixing vessel with a 34% by weight solution of a urea-formaldehyde condensate (molar ratio of urea:formaldehyde 1:1.3) and the resin foam obtained is sprayed through a pipe onto a storage area so that layers 30 cm. in thickness are formed.

After storage for three days, during which the foam is substantially cured, the foam is reduced in size so that particles are formed having a diameter of 0.1 to 20 mm. 0.2 part by volume of water (based on 1 part by volume of foam) is added.

The flaky form is introduced into a tank having a rotating stirrer. Water is added to the container so that a suspension is formed which contains 1 part by volume of foam and 1.2 parts by volume of water.

A mixture of grass seed and sodium alginate is added in such amount to this suspension that there are 25 g. of grass seed and 20 g. of sodium alginate to each 15 liters of suspension of foam and water.

The grass seed is a mixture of seeds of wild grasses and seeds of a more quickly growing variety. The grass from the latter seeds dies off after a season thus supplying the soil with organic matter.

The suspension obtained was forced by means of a two-rotor gear pump through a pipe 400 meters in length and having a diameter of 10 cm., a pressure of up to 15 atmospheres gauge being necessary for the purpose. The final section of the pipe was movable and provided with a spray nozzle. The suspension containing grass seed was applied to a sterile sandy soil so that a layer having a thickness of 1 to 2 cm. was formed. The surface of the sand had previously been leveled and worked with a cultivator. A fortnight later the first germination was observed and four weeks later a turf had been formed which was 70% closed.

In another experiment 5% of glass fibers and in a further experiment 8% of nylon 6 fibers was added during the production of the resin foam suspensions.

Lupine and white clover seeds and a fertilizer containing nitrogen, phosphorus and potash at the rate of 100 g./sq. m. of the area to be greened were introduced into the layer of foam plastic in the same way as described above.

We claim:

1. A suspension for use in sowing waste ground comprising a slurry of cured urea-formaldehyde foam having a particle size of 0.1 to 20 mm. and plant seeds suspended in 0.5 to 5 parts by volume of water for each part by volume of said foam, and further comprising sodium alginate in a ratio of approximately 20 grams of sodium alginate to each 15 liters of suspension of foam and water, to effect a bond between the foam particles and seeds upon application of the suspension to the ground.

2. A suspension as claimed in claim 1 and having suspended therein in an amount up to 20% by weight of glass fibers or plastic fibers.

3. A suspension as claimed in claim 1, wherein said cured urea-formaldehyde foam is one which has been stored for at least one day and said foam having a particle size of 1 to 20 mm.

References Cited

UNITED STATES PATENTS

| | | | |
|---|---|---|---|
| 2,945,322 | 7/1960 | Gaeth et al. | 47—9 |
| 2,971,292 | 2/1961 | Malecki | 47—58 |
| 2,988,441 | 6/1961 | Pruitt | 71—27 |
| 3,067,542 | 12/1962 | O'Brien | 47—9 |
| 3,110,129 | 11/1963 | Baumann | 47—58 |
| 3,292,307 | 12/1966 | Finn | 47—58 |

ROBERT E. BAGWILL, Primary Examiner

U.S. Cl. X.R.

111—1